United States Patent
Tahtinen

(10) Patent No.: US 10,211,537 B2
(45) Date of Patent: Feb. 19, 2019

(54) APPARATUS AND METHODS FOR WIRELESS COUPLING

(71) Applicant: Nokia Technologies Oy, Espoo (FI)

(72) Inventor: Ilkka Tahtinen, Turku (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 345 days.

(21) Appl. No.: 14/769,203

(22) PCT Filed: Feb. 22, 2013

(86) PCT No.: PCT/FI2013/050196
§ 371 (c)(1),
(2) Date: Aug. 20, 2015

(87) PCT Pub. No.: WO2014/128339
PCT Pub. Date: Aug. 28, 2014

(65) Prior Publication Data
US 2015/0380827 A1 Dec. 31, 2015

(51) Int. Cl.
*H01Q 13/16* (2006.01)
*H01F 38/14* (2006.01)
*H01Q 1/22* (2006.01)
*H01Q 13/10* (2006.01)
*H01Q 5/321* (2015.01)
(Continued)

(52) U.S. Cl.
CPC ............. *H01Q 13/16* (2013.01); *H01F 38/14* (2013.01); *H01Q 1/2216* (2013.01); *H01Q 1/24* (2013.01); *H01Q 1/36* (2013.01); *H01Q 5/321* (2015.01); *H01Q 13/103* (2013.01); *H04B 5/00* (2013.01); *H01F 2038/146* (2013.01); *H04B 5/0075* (2013.01)

(58) Field of Classification Search
CPC ........ H01Q 13/16; H01Q 1/36; H01Q 13/103; H01Q 1/24; H04B 5/00
See application file for complete search history.

(56) References Cited

U.S. PATENT DOCUMENTS

2007/0279062 A1   12/2007  Greim et al.
2008/0191260 A1*  8/2008  De Vreede .......... H01L 27/0808
                                                            257/312

(Continued)

FOREIGN PATENT DOCUMENTS

CN        102714347 A    10/2012
CN        102859790 A    1/2013
(Continued)

OTHER PUBLICATIONS

International Search Report and Written Opinion received for corresponding Patent Cooperation Treaty Application No. PCT/FI2013/050196, dated Oct. 24, 2013, 14 pages.

(Continued)

*Primary Examiner* — Graham Smith
*Assistant Examiner* — Jae Kim
(74) *Attorney, Agent, or Firm* — Alston & Bird LLP

(57) ABSTRACT

An apparatus (180) comprising: a first conductive layer (30) defining a first slot (46) having an open end and a closed end, the first slot (46) being configured to receive an inductive coupler (64) therein; and a capacitive member configured to tune the first conductive layer (30) to resonate in an operational frequency band.

16 Claims, 13 Drawing Sheets

(51) Int. Cl.
*H01Q 1/24* (2006.01)
*H01Q 1/36* (2006.01)
*H04B 5/00* (2006.01)

(56) References Cited

U.S. PATENT DOCUMENTS

| | | |
|---|---|---|
| 2009/0091501 A1 | 4/2009 | Mizoroki et al. |
| 2010/0073247 A1 | 3/2010 | Arkko et al. |
| 2010/0289713 A1* | 11/2010 | Taura .................. H01Q 1/243 343/767 |
| 2011/0287715 A1 | 11/2011 | Matsuura et al. |
| 2012/0075148 A1 | 3/2012 | Cho |
| 2012/0091821 A1 | 4/2012 | Kato et al. |
| 2012/0098729 A1 | 4/2012 | Kato et al. |
| 2012/0227248 A1 | 9/2012 | Orihara et al. |
| 2014/0203993 A1* | 7/2014 | Toyao .................. H01Q 13/10 343/867 |

FOREIGN PATENT DOCUMENTS

| | | |
|---|---|---|
| EP | 1343224 A1 | 9/2003 |
| EP | 2372840 A2 | 10/2011 |
| EP | 2557630 A1 | 2/2013 |
| JP | H0289698 A | 3/1990 |
| JP | H07307611 A | 11/1995 |
| JP | H1125244 A | 1/1999 |
| JP | 2003-331250 A | 11/2003 |
| JP | 2004-064780 A | 2/2004 |
| JP | 2004-348497 A | 12/2004 |
| JP | 2010-093597 A | 4/2010 |
| JP | 2011-250406 A | 12/2011 |
| JP | 2012-049714 A | 3/2012 |
| JP | 2012-105360 A | 5/2012 |
| JP | 2012213126 A | 11/2012 |
| WO | 2011055003 A1 | 5/2011 |
| WO | 2012/014975 A1 | 2/2012 |
| WO | 2013/011865 A1 | 1/2013 |
| WO | 2013/115017 A1 | 8/2013 |

OTHER PUBLICATIONS

Williams, "Optimization of Near Field Coupling for Efficient Power Transfer Utilizing Multiple Coupling Structures", Thesis, May 3, 2011, 97 pages.

Hirvonen et al., "Multi-system, Multi-band RFID Antenna: Bridging the Gap Between HF- and UHF-based RFID Applications", Proceedings of 38th European Conference on Wireless Technology, Oct. 2008, pp. 1767-1770.

Mayer, "Antenna Design for Future Multi-standard and Multi-frequency RFID Systems", Dissertation, 2009, 128 pages.

Office action received for corresponding Japanese Patent Application No. 2015-558515, dated Aug. 9, 2016, 3 pages of office action and 5 pages of Translation available.

Extended European Search Report received for corresponding European Patent Application No. 13875792.7, dated Sep. 16, 2016, 9 pages.

Office action received for corresponding Chinese Patent Application No. 201380073614.6, dated Nov. 23, 2016, 5 pages of office action and no pages of office action translation available.

Office action received for corresponding Japanese Patent Application No. 2015-558515, dated Feb. 21, 2017, 3 pages of allowance and no pages of office action translation available.

Office action received for corresponding Chinese Patent Application No. 201380073614.6, dated Feb. 24, 2017, 3 pages of office action and 3 pages of office action translation available.

\* cited by examiner

1

APPARATUS AND METHODS FOR WIRELESS COUPLING

RELATED APPLICATION

This application was originally filed as Patent Cooperation Treaty Application No. PCT/FI2013/050196 filed Feb. 22, 2013.

TECHNOLOGICAL FIELD

Embodiments of the present invention relate to apparatus and methods for wireless coupling. In particular, they relate to apparatus for wireless coupling in portable electronic devices.

BACKGROUND

Apparatus, such as portable electronic devices, usually include one or more antennas for enabling the apparatus to couple wirelessly with another device. For example, the apparatus may include a near field antenna such as a radio frequency identification (RFID) or Near Field Communication (NFC) antenna. Antennas require space within the apparatus and may cause the volume of the apparatus to be greater than desired.

It would therefore be desirable to provide an alternative apparatus.

BRIEF SUMMARY

According to various, but not necessarily all, embodiments of the invention there is provided an apparatus comprising: a first conductive layer defining a first slot having an open end and a closed end, the first slot being configured to receive an inductive coupler therein; and a capacitive member configured to tune the first conductive layer to resonate in an operational frequency band.

The capacitive member may include a capacitor arrangement connected to the first conductive layer and positioned at the first slot, the capacitor arrangement including at least one capacitor.

The capacitor arrangement may be switchable between a first electrical configuration in which the capacitor is electrically connected to the first conductive layer, and a second electrical configuration in which the capacitor is electrically disconnected from the first conductive layer.

The capacitor arrangement may comprise a further capacitor positioned at in the first slot, wherein when the capacitor arrangement is in the second electrical configuration, the further capacitor is electrically connected to the first conductive layer.

The capacitor may be a varactor.

The capacitive member may include a conductive member positioned in a different plane to the first conductive layer and extending from the first conductive layer adjacent the first slot.

The apparatus may further comprise an inductive coupler positioned within the first slot and electrically isolated from the first conductive layer.

The inductive coupler may be configured to resonate in a first operational frequency band different to the operational frequency band of the first conductive layer.

The apparatus may further comprise a second conductive layer defining a second slot having an open end and a closed end and configured to receive the inductive coupler therein, the second conductive layer being electrically coupled to the first conductive layer.

The second conductive layer may at least partially overlay the first conductive layer.

The first slot and the second slot may extend in different directions for at least part of their length.

The first slot and the second slot may extend in opposite directions for at least part of their lengths and the first conductive layer and the second conductive layer may form a coil shape.

The first conductive layer and the second conductive layer may be electrically coupled via a conductive connector, the conductive connector coupling an edge portion of the first conductive layer with an edge portion of the second conductive layer.

The capacitive member may include the second conductive layer.

The first and second conductive layers may be layers of a printed wiring board.

The first conductive layer and/or the second conductive layer may form at least part of a cover of a portable electronic device.

According to various, but not necessarily all, embodiments of the invention there is provided a portable electronic device comprising an apparatus as described in any of the preceding paragraphs.

According to various, but not necessarily all, embodiments of the invention there is provided a method comprising: providing a first conductive layer defining a first slot having an open end and a closed end, the first slot being configured to receive an inductive coupler therein; and providing a capacitive member configured to tune the first conductive layer to resonate in an operational frequency band.

The capacitive member may include a capacitor arrangement connected to the first conductive layer and positioned at the first slot, the capacitor arrangement including at least one capacitor.

The capacitor arrangement may be switchable between a first electrical configuration in which the capacitor is electrically connected to the first conductive layer, and a second electrical configuration in which the capacitor is electrically disconnected from the first conductive layer.

The capacitor arrangement may comprise a further capacitor positioned at in the first slot, wherein when the capacitor arrangement is in the second electrical configuration, the further capacitor is electrically connected to the first conductive layer.

The capacitor may be a varactor.

The capacitive member may include a conductive member positioned in a different plane to the first conductive layer and extends from the first conductive layer adjacent the first slot.

The method may further comprise positioning an inductive coupler within the first slot, the inductive coupler being electrically isolated from the first conductive layer.

The inductive coupler may be configured to resonate in a first operational frequency band different to the operational frequency band of the first conductive layer.

The method may further comprise providing a second conductive layer defining a second slot having an open end and a closed end and configured to receive the inductive coupler therein, the second conductive layer being electrically coupled to the first conductive layer.

The second conductive layer may at least partially overlays the first conductive layer. The first slot and the second slot may extend in different directions for at least part of their length.

The first slot and the second slot may extend in opposite directions for at least part of their lengths and the first conductive layer and the second conductive layer form a coil shape.

The first conductive layer and the second conductive layer may be electrically coupled via a conductive connector, the conductive connector coupling an edge portion of the first conductive layer with an edge portion of the second conductive layer.

The capacitive member may include the second conductive layer.

The first and second conductive layers may be layers of a printed wiring board.

The first conductive layer and/or the second conductive layer may form at least part of a cover of a portable electronic device.

BRIEF DESCRIPTION

For a better understanding of various examples that are useful for understanding the description, reference will now be made by way of example only to the accompanying drawings in which.

DETAILED DESCRIPTION

Throughout the description, the term "antenna" is used, but this term may also be referred to as "coupler", "electromagnetic coupler", "inductive coupler" or "resonant transformer coil". Furthermore, the various examples relate to "near field coupling" rather than "far field" operation.

In the following description, the wording 'connect' and 'couple' and their derivatives mean operationally connected or coupled. It should be appreciated that any number or combination of intervening components can exist (including no intervening components). Additionally, it should be appreciated that the connection or coupling may be a physical galvanic connection and/or an electromagnetic connection.

Inductance is the property of an electric conductor as a result of which an electromotive force (voltage) is created by a change of current. The property of the electric conductor is known as self-inductance and neighbouring conductors comprised of mutual inductance. Induced current in a conductor acts in a manner that opposes the change that created the induced current.

In the various examples described in the following paragraphs, an apparatus may comprise of neighbouring conductors as described in the preceding paragraph having an inductive coupler therein. Inductance in neighbouring conductors comprises a resonant circuit with capacitive loading. Appropriate apparatus resonance frequency, enhancement in mutual inductance and magnetic coupling to a larger receiver coil may be provided.

Figure 1:
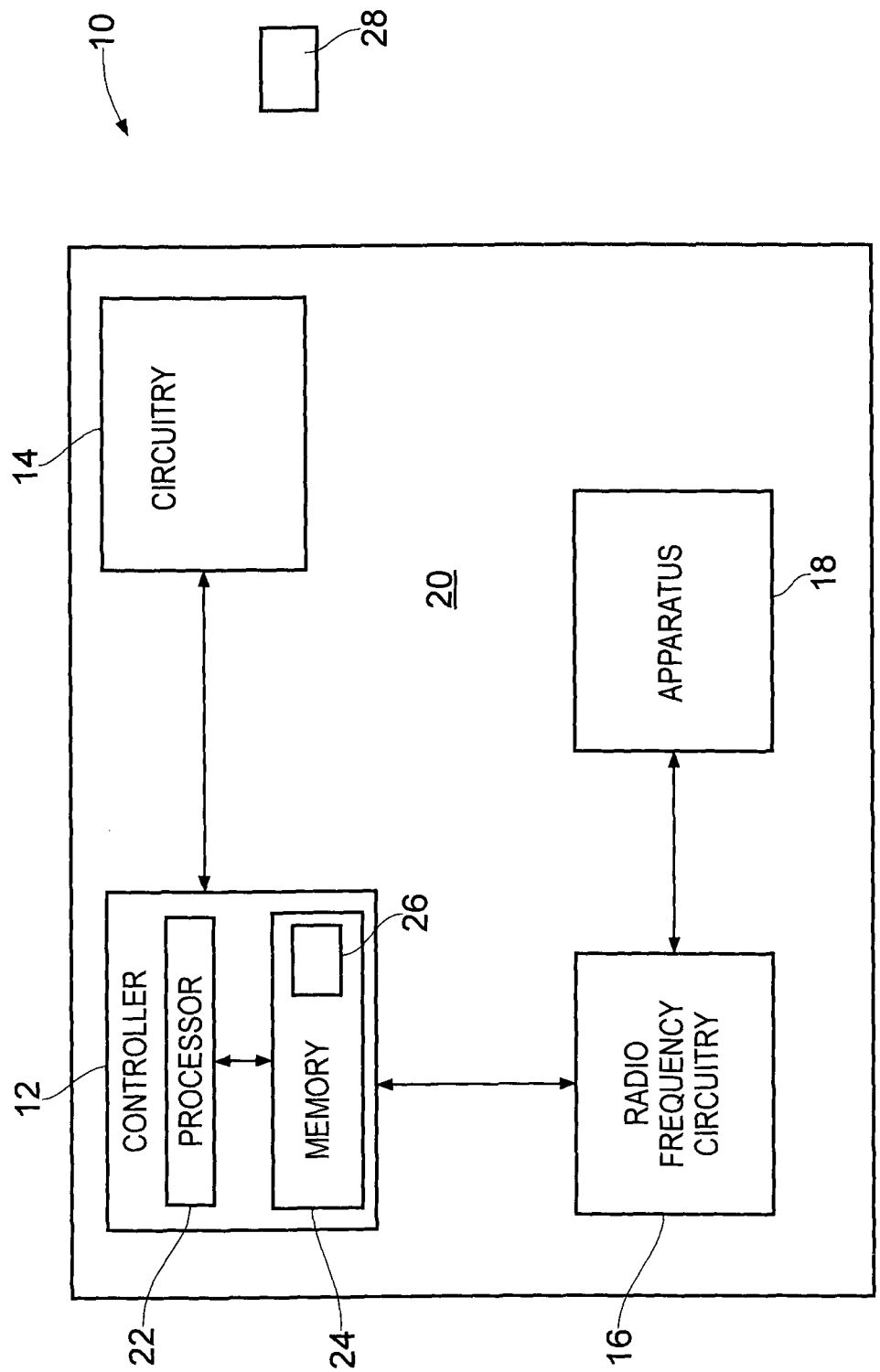
FIG. 1 illustrates a schematic diagram of a portable electronic device including an apparatus according to various examples.

FIG. 1 illustrates an electronic device 10 including a controller 12, circuitry 14, radio frequency circuitry 16, apparatus 18 and a ground member 20. The electronic device 10 may be any apparatus such as a hand portable electronic device (for example, a mobile cellular telephone, a tablet computer, a laptop computer, a personal digital assistant or a hand held computer), a non-portable electronic device (for example, a personal computer), a portable multimedia device (for example, a music player, a video player, a game console and so on) or a module for such devices. The electronic device 10 may be a portable electronic device, being any of the above mentioned hand portable electronic devices or portable electronic devices. As used here, the term 'module' refers to a unit or apparatus that excludes certain parts or components that would be added by an end manufacturer or a user.

The implementation of the controller 12 can be in hardware alone (for example, a circuit, a processor and so on), have certain aspects in software including firmware alone or can be a combination of hardware and software (including firmware).

The controller 12 may be implemented using instructions that enable hardware functionality, for example, by using executable computer program instructions in a general-purpose or special-purpose processor 22 that may be stored on a computer readable storage medium 24 (disk, memory and so on) to be executed by such a processor 22.

The processor 22 is configured to read from and write to the memory 24. The processor 22 may also comprise an output interface via which data and/or commands are output by the processor 22 and an input interface via which data and/or commands are input to the processor 22.

The memory 24 stores a computer program 26 comprising computer program instructions (computer program code) that controls the operation of the electronic device 10 when loaded into the processor 22. The computer program instructions, of the computer program 26, provide the logic and routines that enables the electronic device 10 to perform the methods described below. The processor 22 by reading the memory 24 is able to load and execute the computer program 26.

The computer program 26 may arrive at the electronic device 10 via any suitable delivery mechanism 28. The delivery mechanism 28 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 26. The delivery mechanism 28 may be a signal configured to reliably transfer the computer program 26. The electronic device 10 may propagate or transmit the computer program 26 as a computer data signal.

Although the memory 24 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The circuitry 14 includes additional electronic components of the electronic device 10. For example, where the electronic device 10 is a portable electronic device (such as a mobile phone), the circuitry 14 may include input/output devices such as an audio input device (a microphone for example), an audio output device (a loudspeaker for example) and a display.

The radio frequency circuitry 16 is connected between the controller 12 and the apparatus 18 and may include a receiver and/or a transmitter and/or a transceiver. The controller 12 is configured to provide signals to, and/or receive signals from the radio frequency circuitry 14. The electronic device 10 may optionally include one or more matching circuits, filters, switches, or other radio frequency circuit elements, and combinations thereof, between the radio frequency circuitry 16 and the apparatus 18.

The apparatus 18 may also be referred to as an antenna arrangement and is configured to enable the electronic device 10 to wirelessly couple with other electronic devices. The apparatus 18 is described in detail in the following paragraphs with reference to various examples.

The radio frequency circuitry 16 and the apparatus 18 may be configured to operate in a plurality of operational resonant frequency bands and via one or more protocols. For example, the operational frequency bands and protocols may include (but are not limited to) amplitude modulation (AM) radio (0.535-1.705 MHz); frequency modulation (FM) radio (76-108 MHz); digital radio mondiale (DRM) (0.15-30 MHz); digital radio mondiale+ (DRM+) radio (47-68 MHz, 65.8-74 MHz, 76-90 MHz, 87.5-107.9 MHz); radio frequency identification low frequency (RFID LF) (0.125-0.134 MHz); radio frequency identification high frequency (RFID HF) (13.56-13.56 MHz); Qi wireless power consortium standard; alliance for wireless power (A4WP) (6.78 MHz), charging standards; and HAC (hearing aid coil).

A frequency band over which an antenna can efficiently operate using a protocol is a frequency range where the antenna's return loss is less than an operational threshold. For example, efficient operation may occur when the antenna's return loss is better than (that is, less than) −4 dB or −6 dB.

The apparatus 18, the electronic components that provide the radio frequency circuitry 16, the circuitry 14 and the controller 12 may be interconnected via the ground member 20 (for example, a printed wiring board). The ground member 20 may be used as part of the apparatus 18 by using two or more layers of the printed wiring board 20. In some examples, the ground member 20 may be formed from several conductive parts of the electronic device 10, one part of which may include the printed wiring board. For example, at least a part of the ground member 20 may comprise at least a portion of an external conductive housing of the electronic device 10, the at least one portion of the external conductive housing may or may not be coupled to a printed wiring board. The ground member 20 may be planar or non-planar.

Figure 2:
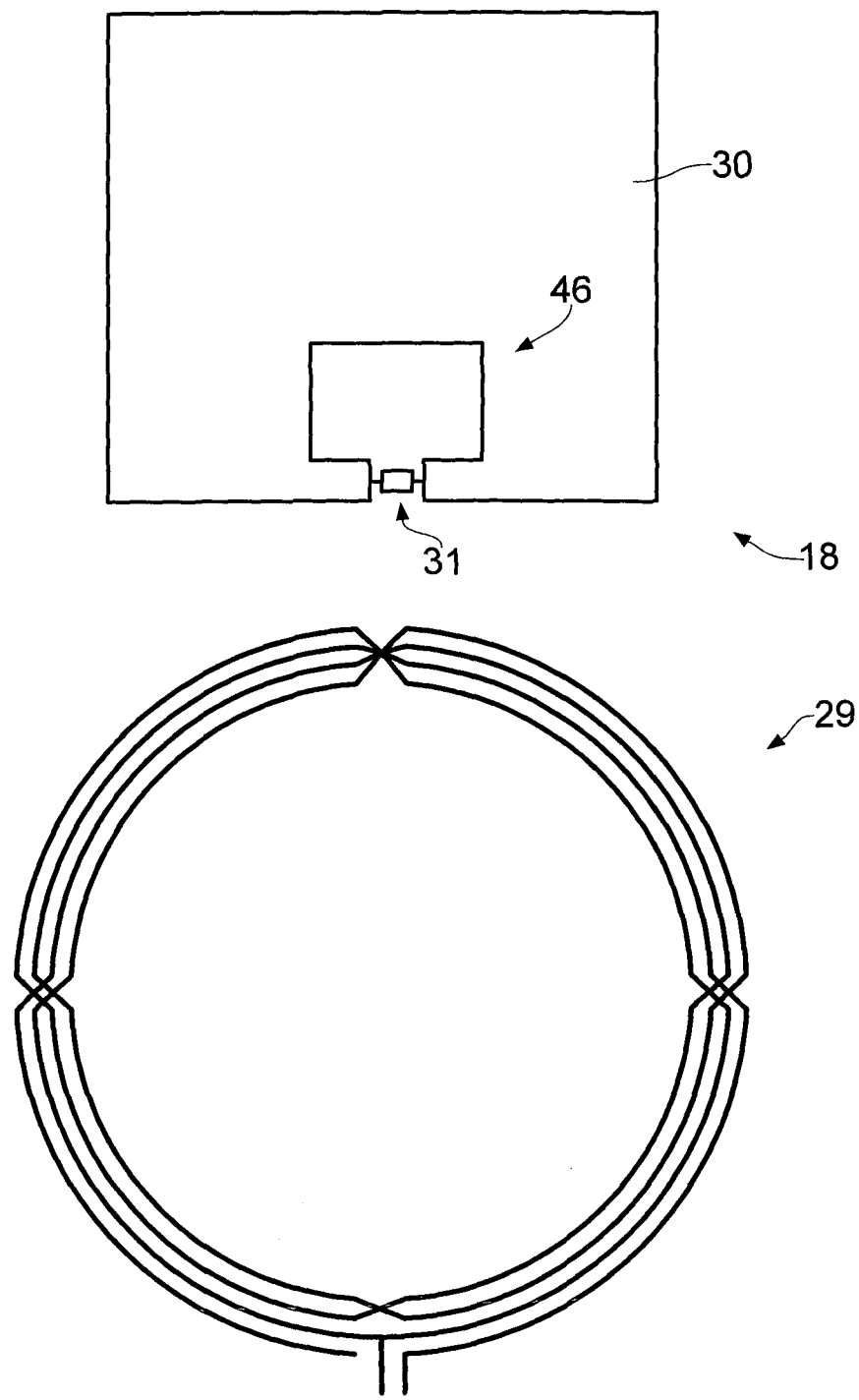
FIG. 2 illustrates a schematic diagram of an apparatus according to an example, and an inductive receiver coil.

FIG. 2 illustrates a schematic diagram of an apparatus 18 according to an example, and an inductive coil 29. The inductive receiver coil 29 (not drawn to scale with the apparatus 18) is provided within a separate apparatus or device to the apparatus 18 and may be arranged to transmit and/or receive a signal. Consequently, the apparatus 18 and the inductive receiver coil 29 are movable relative to one another.

The apparatus 18 includes a conductive layer 30 that defines a slot 46 having an open end and a closed end. The slot 46 is configured to receive an inductive coupler therein (in other words, the slot 46 is shaped and dimensioned to be able to receive an inductive coupler).

The apparatus 18 also includes a capacitive member 31 configured to tune the conductive layer 30 to be able to resonate in an operational frequency band. The capacitive member 31 may be any suitable member that tunes the resonance of the conductive layer 30 and may include, for example, one or more capacitors, one or more varactors, or a further conductive layer that capacitively couples with the conductive layer 30. In this example, the capacitive member 31 is located at the opening of the slot 46 and is connected to the opposing edges of the conductive layer 30.

When the apparatus 18 includes an inductive coupler in the slot 46, the inductive coupler may inductively couple with the conductive layer 30 and generate eddy currents in the conductive layer 30 that causes the conductive layer 30 to radiate a magnetic field. The inductive coupler and the conductive layer 30 may inductively couple with the inductive receiver coil 29 and thereby communicate with the inductive receiver coil 29.

The apparatus 18 provides an advantage in that the conductive layer 30 may improve inductive coupling between the apparatus 18 and the inductive receiver coil 29. The slot 46 in the conductive layer 30 advantageously prevents eddy currents in the conductive layer 30 from cancelling out.

In some examples, the inductive coupler may radiate in a first operational frequency band, and the conductive layer 30 may radiate in a second operational frequency band, different to the first operational frequency band. For example, the inductive coupler may operate in a communication mode and be coupled to the conductive layer 30 (which is non-resonant at that frequency band), and in a mode where the inductive coupler is coupled to the conductive layer 30 (which is resonant at that frequency band).

Figure 3:
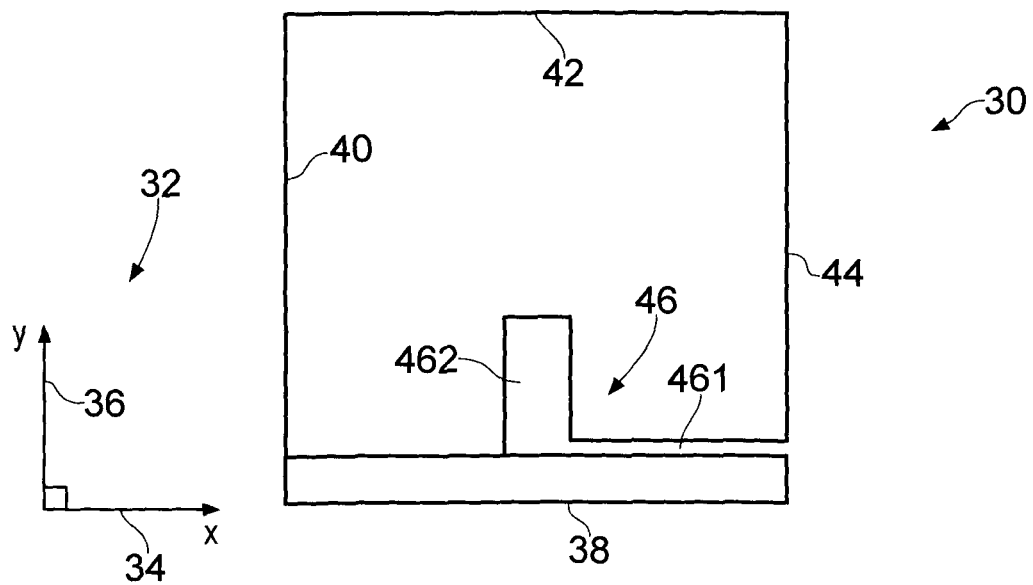
FIG. 3 illustrates a plan view of a first conductive layer according to an example.
Figure 5:
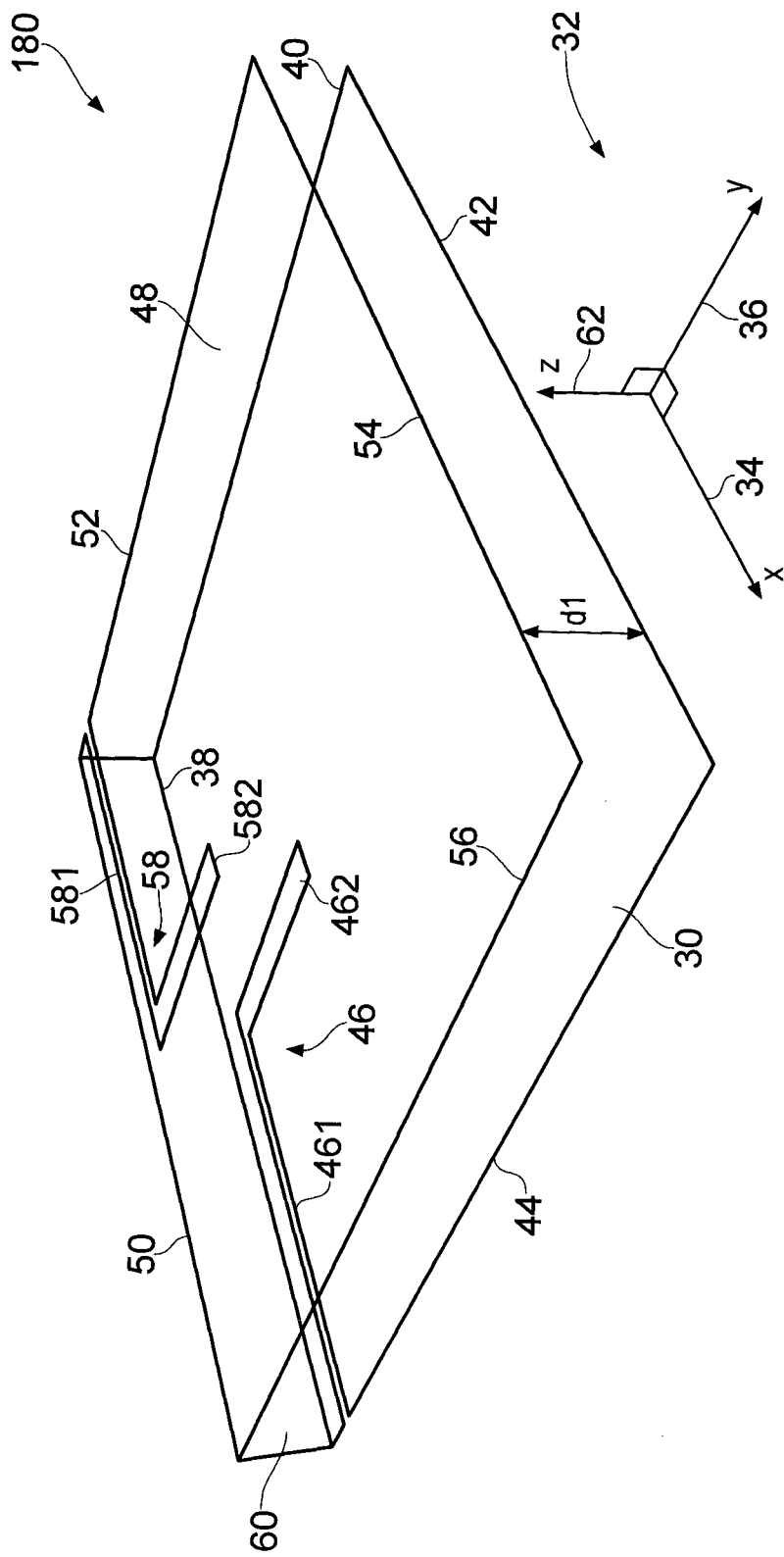
FIG. 5 illustrates a perspective view of another apparatus including the first conductive layer illustrated in FIG. 3 and the second conductive layer illustrated in FIG. 4.

FIG. 3 illustrates a plan view of a first conductive layer 30 of an apparatus 180 (as illustrated in FIG. 5) and a Cartesian co-ordinate system 32. The Cartesian co-ordinate system 32 includes an X axis 34, a Y axis 36 and a Z axis (not illustrated in FIG. 3) that are orthogonal to one another. The first conductive layer 30 is similar to the conductive layer illustrated in FIG. 2, and where the features are similar, the same reference numerals are used. The first conductive layer 30 may be a layer of the ground member 20 (for example, the first conductive layer 30 may be a conductive layer of a printed wiring board) or may be part of a housing for the electronic device 10.

The first conductive layer 30 is planar and is oriented parallel to the plane defined by the X axis 34 and the Y axis 36. The first conductive layer 30 has a first edge 38, a second edge 40, a third edge 42 and a fourth edge 44. The first edge 38 is parallel to the third edge 42, and the second edge 40 is parallel to the fourth edge 44.

The first conductive layer 30 defines a slot 46 having a first part 461 and a second part 462. The first part 461 of the slot 46 extends from the fourth edge 44 (at the corner of the first conductive layer 30 defined by the first edge 38 and the fourth edge 44) in the −X direction 34 until an end position halfway between the second edge 40 and the fourth edge 44. The second part 462 of the slot 46 extends from the end position of the first part 461 in the +Y direction 36. Consequently, the slot 46 has an L shape. The width of the second part 462 is greater than the width of the first part 461.

Figure 4:
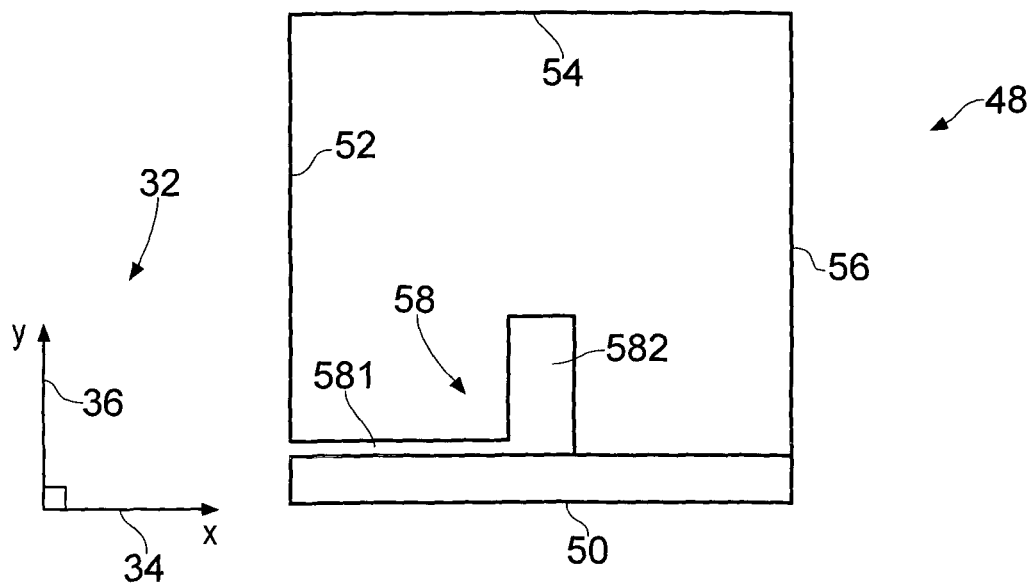
FIG. 4 illustrates a plan view of a second conductive layer according to an example.

FIG. 4 illustrates a plan view of a second conductive layer 48 of the apparatus 180 (illustrated in FIG. 5) and the Cartesian co-ordinate system 32. The second conductive layer 48 may be a layer of the ground member 20 (for example, the second conductive layer 48 may be a conductive layer of a printed wiring board) or may be part of a housing for the electronic device 10.

The second conductive layer 48 is planar and is oriented parallel to the plane defined by the X axis 34 and the Y axis 36. The second conductive layer 48 has a first edge 50, a second edge 52, a third edge 54 and a fourth edge 56. The first edge 50 is parallel to the third edge 54, and the second edge 52 is parallel to the fourth edge 56.

The second conductive layer 48 defines a slot 58 having a first part 581 and a second part 582. The first part 581 of the slot 58 extends from the second edge 52 (at the corner of the second conductive layer 48 defined by the first edge 50 and the second edge 52) in the +X direction 34 until an end position halfway between the second edge 52 and the fourth edge 56. The second part 582 of the slot 58 extends from the end position of the first part 581 in the +Y direction 36. Consequently, the slot 58 has an inverted L shape. The width of the second part 582 is greater than the width of the first part 581.

Where the ground member 20 is a printed wiring board, the ground plane layer in the printed wiring board 20 may be a separate portion to the first conductive layer 30 or the second conductive layer 48. For example, while there is an electrical connection between ground plane layer and the first conductive layer 30 or the second conductive layer 48, the first conductive layer 30 or the second conductive layer 48 may be a portion of the ground plane layer which projects out from the ground plane layer.

In other examples, the edges of the first conductive layer 30 and the second conductive layer 48 may not be parallel or orthogonal to one another and it should be appreciated that any shape of conductive layer is possible, for example, circular, ovular and so on. The first conductive layer 30 and/or the second conductive layer 48 may be non-planar or a combination of both planar and non-planar. The first conductive layer 30 and/or the second conductive layer 48 may also take the three dimensional form of the outer housing of the device and may thus be curved in three dimensions.

The slots 46 and 58 may also be defined anywhere on the conductive layer and is not limited to the illustrated example.

FIG. 5 illustrates a perspective view of an apparatus 180 including the first conductive layer 30 (as illustrated in FIG. 3), the second conductive layer 48 (as illustrated in FIG. 4) and a conductive connector 60. FIG. 5 also illustrates the Cartesian coordinate system 32 with the Z axis 62.

The first part 461 of the slot 46 extends in an opposite direction to the first part 581 of the slot 58. The second conductive layer 48 overlays the first conductive layer 30 (that is, the second conductive layer 48 is positioned above the first conductive layer 30 in the Z axis 62) and are separated from one another by a distance d1. A dielectric layer (not illustrated) may be positioned within the space between the first and second conductive layers 30, 48.

The first and second conductive layers 30, 48 are arranged so that the second part 582 of the slot 58 overlays the second part 462 of the slot 46. The second part 462 and the second part 582 are configured to receive an inductive coupler therein. In particular, the second part 462 and the second part 582 are sized and spaced in order to receive an inductive coupler therein.

The conductive connector 60 electrically couples the first conductive layer 30 and the second conductive layer 48 (that is, the conductive connector 60 provides a galvanic coupling between the first and second conductive layers 30, 48). In this example, the conductive connector 60 extends from the first edge 38 of the first conductive layer 30 in the +Z direction to the first edge 50 of the second conductive layer 48. It should be appreciated that the first conductive layer 30 and the second conductive layer 48 form a coil or helical shape. In particular, the electrical path defined by the slot 46, the conductive connector 60 and the slot 58 forms a coil or spiral shape that has two turns.

The conductive portion 60 which joins the two layers 30, 48 may be a thin narrow strip of conductive material between the two layers or may extend along the whole length of one side of each of the conductive layers 30, 48.

Figure 6:
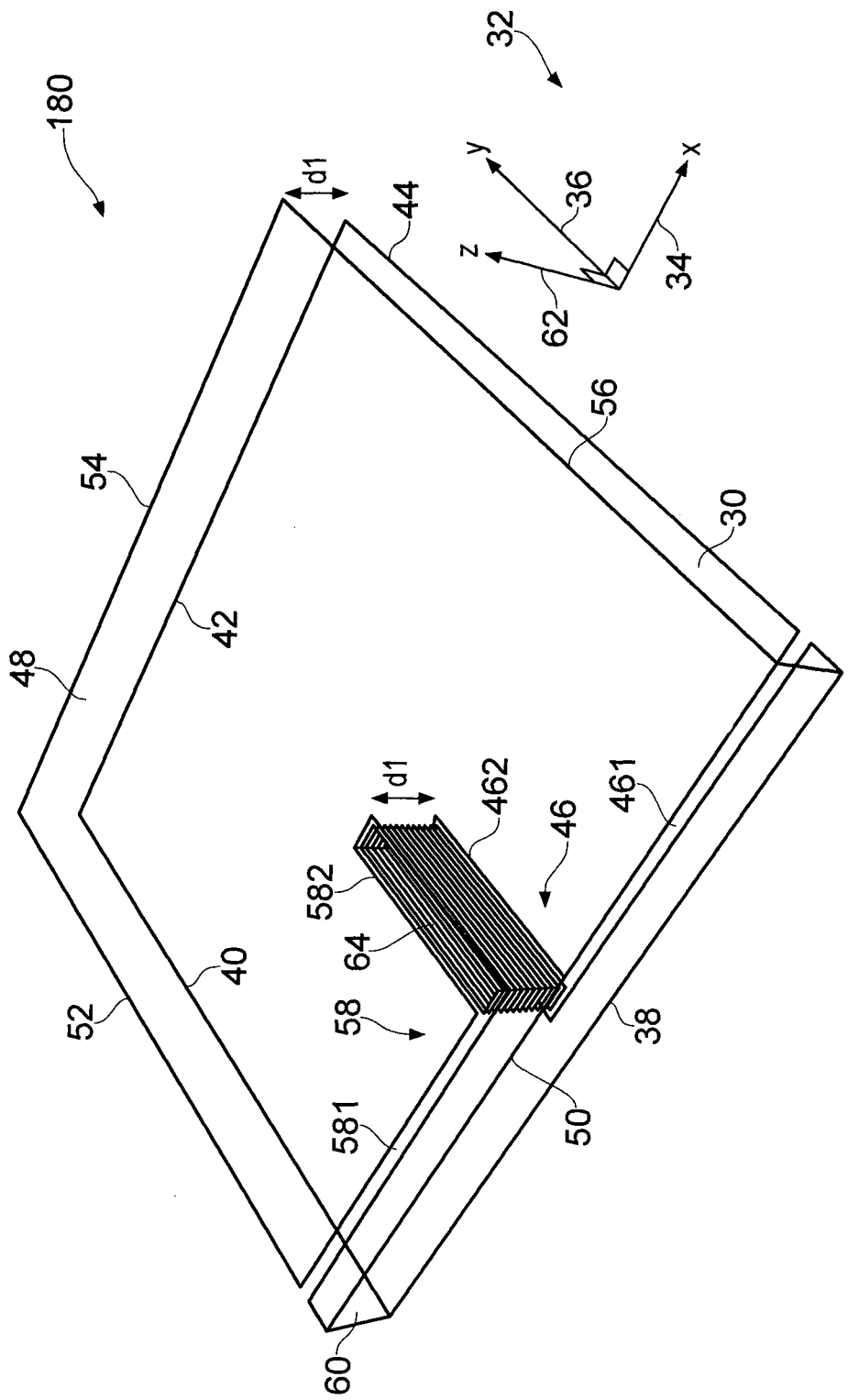
FIG. 6 illustrates a perspective view of the apparatus illustrated in FIG. 5 further comprising an inductive coupler.

FIG. 6 illustrates a perspective view of the apparatus illustrated in FIG. 5 further comprising an inductive coupler 64.

The inductive coupler 64 includes a conductive elongate member arranged in a coil and which has a plurality of turns (in other words, the inductive coupler 64 is a solenoid). The turns of the inductive coupler 64 have a rectangular shape (parallel to the X-Y plane) and are arranged along a line parallel to the Z axis 62. The length of the inductive coupler 64 (in the Z axis 62) is equal to d1 (that is, the length of the inductive coupler 64 is equal to the spacing between the first and second conductive layers 30, 48). The electrical length of the inductive coupler 64 (that is, the length of the conductive elongate member including any reactive components) is selected to enable the inductive coupler to operate in a first operational frequency band.

The inductive coupler 64 is positioned within the second part 462 of the slot 46 and within the second part 582 of the slot 58 and extends between the first and second conductive layers 30, 48. The inductive coupler 64 is coupled to the radio frequency circuitry 16 and is configured to receive signals from the radio frequency circuitry 16 and/or provide signals to the radio frequency circuitry 16.

The first and second conductive layers 30, 48 (including the conductive connector 60 and any reactive components) define an electrical path that has a second electrical length that is selected to enable the first and second conductive layers 30, 48 to resonate in a second operational frequency band. An alternating current in the inductive coupler 64 causes the inductive coupler 64 to generate a magnetic field that excites eddy currents in the first conductive layer 30 and the second conductive layer 48. The first and second conductive layers 30, 48 are thus configured to parasitically couple to the inductive coupler 64 to enable the apparatus 180 to operate in the first operational frequency band and the second operational frequency band.

Figure 7A:
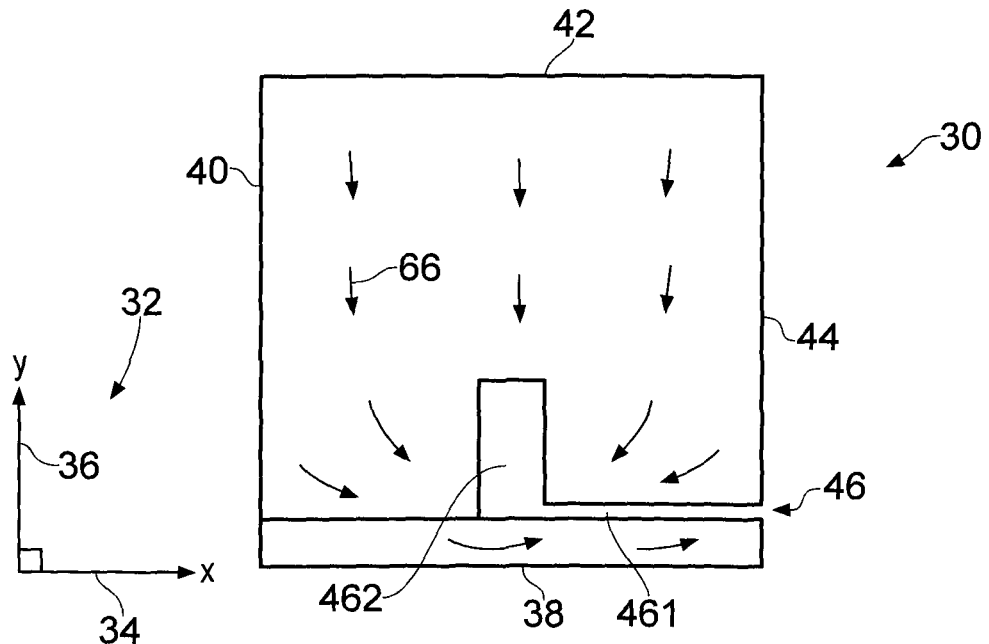
FIG. 7A illustrates a plan view of the electrical current in a top surface of the first conductive layer.

FIG. 7A illustrates a plan view of the electrical current 66 in a top surface of the first conductive layer 30 when the first conductive layer 30 is being excited by the inductive coupler 64. FIG. 7A also illustrates the Cartesian coordinate system 32. The electrical current 66 generally flows from the third edge 42 towards the first edge 38 and the second part 462 of the slot 46. However, the electrical current 66 flows in the +X direction 34 along the first edge 38 and underneath the first part 461 of the slot 46. The electrical current 66 flows in the −X direction 34 above the first part 461 of the slot 46. Consequently, the slot 46 advantageously prevents the electrical currents 66 from cancelling out.

Figure 7B:
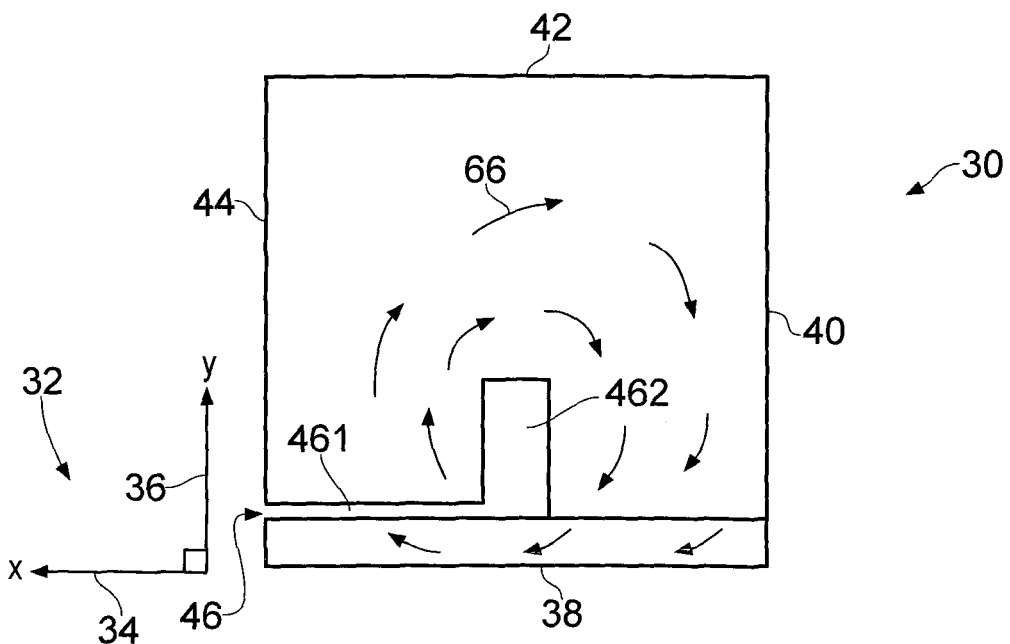
FIG. 7B illustrates a plan view of the electrical current in a bottom surface of the first conductive layer.

FIG. 7B illustrates a plan view of the electrical current 66 in a bottom surface of the first conductive layer 30 when the first conductive layer 30 is being excited by the inductive coupler 64. FIG. 7B also illustrates the Cartesian coordinate system 32. The electrical current 66 flows around the second part 462 of the slot 46 in a clockwise direction.

Figure 8A:
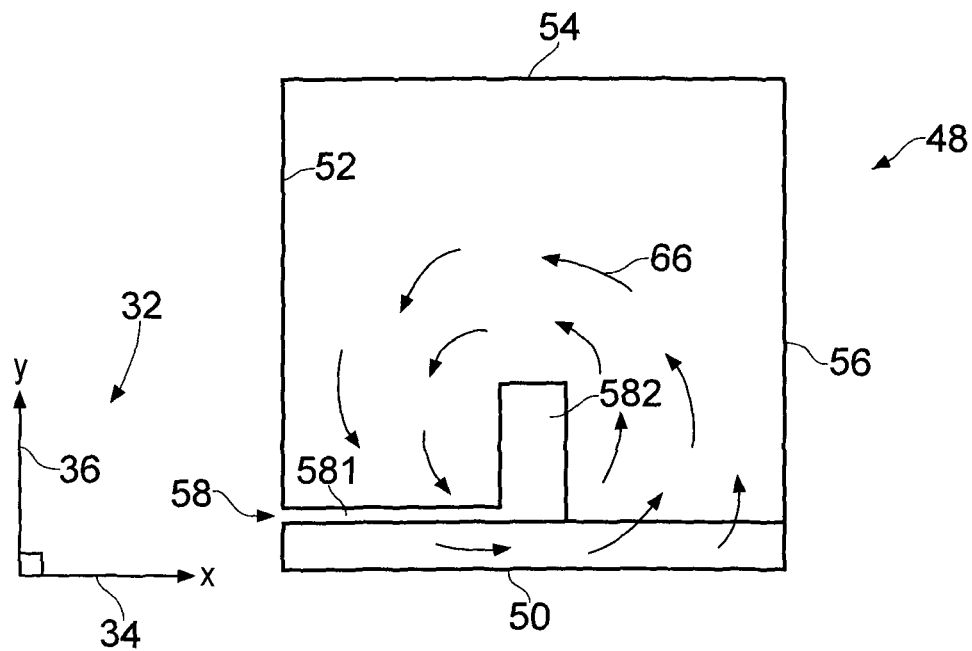
FIG. 8A illustrates a plan view of the electrical current in a top surface of the second conductive layer.

FIG. 8A illustrates a plan view of the electrical current 66 in a top surface of the second conductive layer 48 when the second conductive layer 30 is being excited by the inductive coupler 64. FIG. 8A also illustrates the Cartesian coordinate system 32. The electrical current 66 flows around the second part 582 of the slot 58 in an anti-clockwise direction.

Figure 8B:
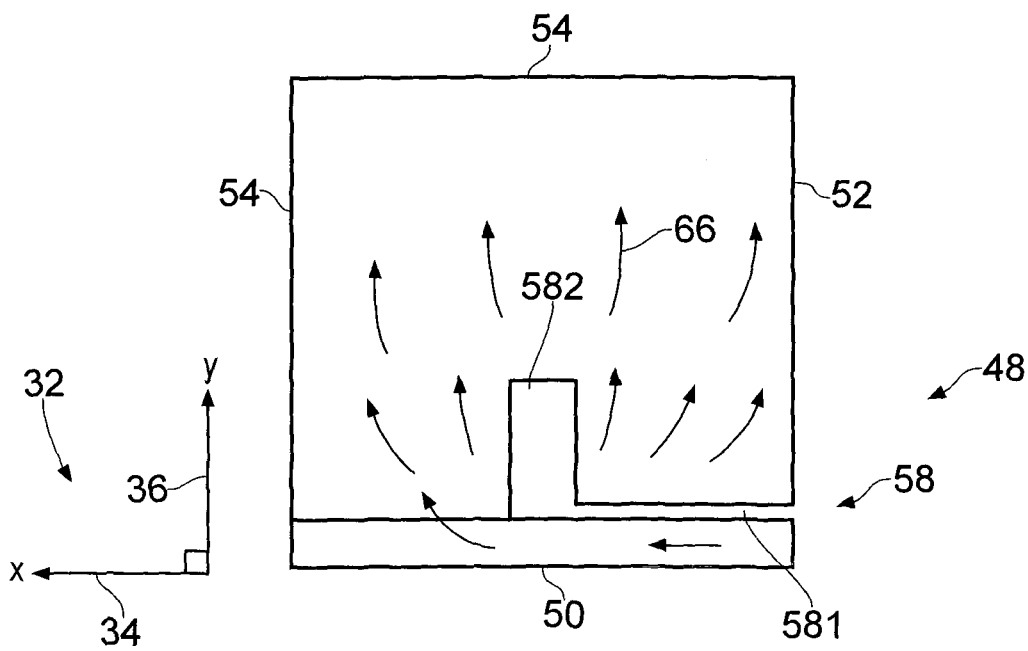
FIG. 8B illustrates a plan view of the electrical current in a bottom surface of the second conductive layer.

FIG. 8B illustrates a plan view of the electrical current 66 in a bottom surface of the second conductive layer 48 when the second conductive layer 30 is being excited by the inductive coupler 64. FIG. 8B also illustrates the Cartesian coordinate system 32. The electrical current 66 flows generally from the first edge 50 towards the third edge 54. However, at the first edge 50 and underneath the first part 581 of the slot 58, the electrical current 66 flows in the +X direction 34.

The apparatus 180 provides an advantage in that the inductive coupler and the combination of the first conductive layer 30 and the second conductive layer 48 enables the electronic device to operate in a first operational frequency band and a second operational frequency band that is different to the first operational frequency band. The second operational frequency band may advantageously be selected during manufacture of the apparatus 180 by selecting appropriate values for the distance d1, the length of the slots 46, 58 and the dimensions of the first and second conductive layers 30, 48 for example.

Additionally, the apparatus 180 is advantageous in that since the first conductive layer 30 and/or the second conductive layer 48 may be a layer in a printed wiring board or a housing of the electronic device 10, the apparatus 180 may occupy a relatively small volume within the electronic device 10.

Furthermore, the apparatus 180 may advantageously have a relatively high magnetic coupling strength with other electronic devices due to the relatively large dimensions of the first and second conductive layers 30, 48 (relative to the inductive coupler 64). Also, a relatively small inductive coupler may be used to excite eddy currents in the first and second conductive layers 30, 48 and consequently, the second parts 462, 582 of the slots 46, 58 may be relatively small.

Figure 9:
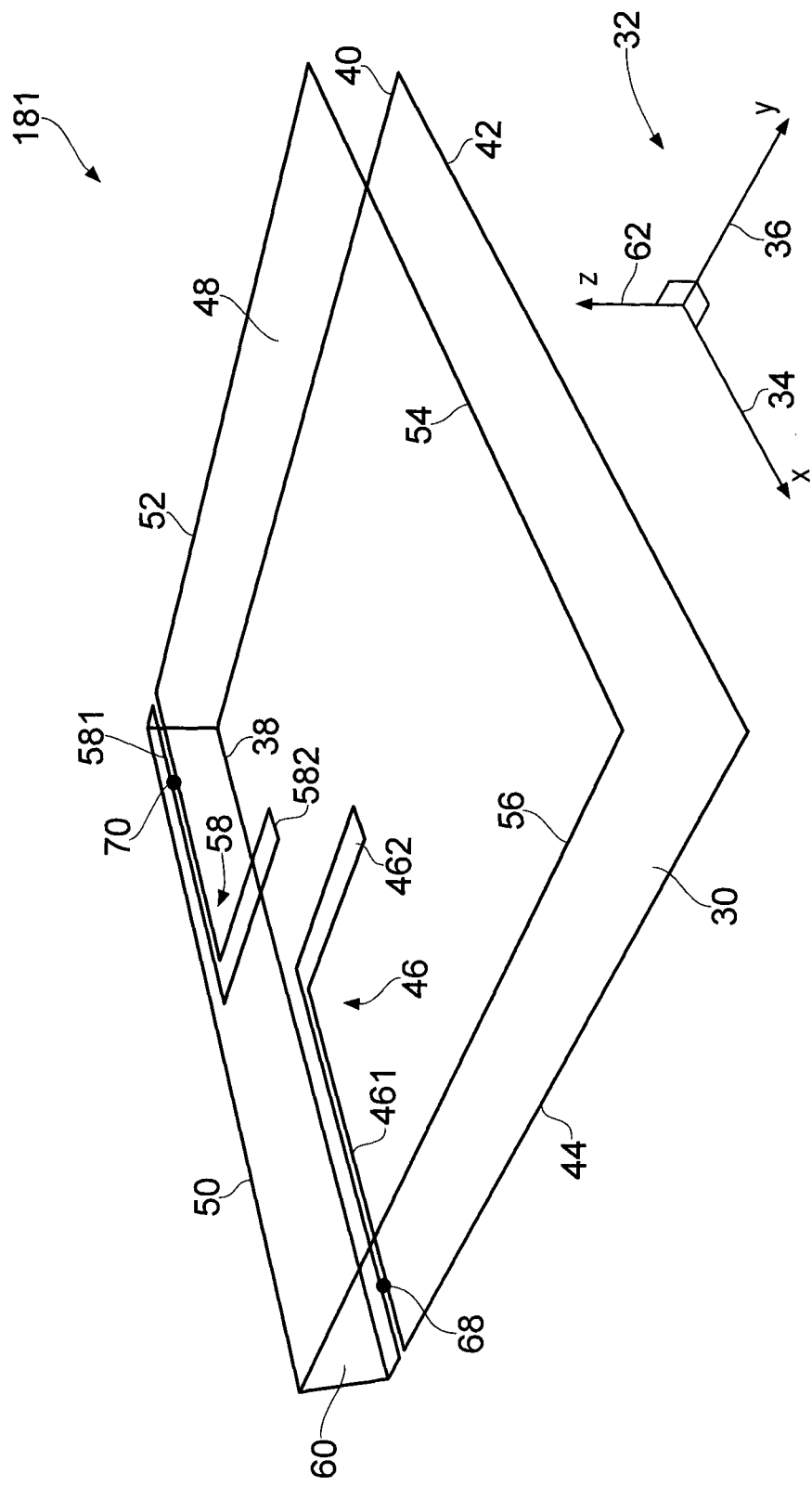
FIG. 9 illustrates a perspective view of another apparatus according to an example.

FIG. 9 illustrates a perspective view of another apparatus 181 according to an example. The apparatus 181 is similar to the apparatus 180 and where the features are similar, the same reference numerals are used.

The apparatus 181 differs from the apparatus 180 in that the apparatus 181 includes a first capacitor arrangement 68 positioned within the first slot 46 and coupled to the first conductive layer 30. The apparatus 181 also includes a second capacitor arrangement 70 positioned within the second slot 58 and coupled to the second conductive layer 48.

The first and second capacitor arrangements 68, 70 form part of the second electrical length of the combination of the first and second conductive layers 30, 48 and consequently shift the resonant frequency band of the combination relative to the example described above with reference to FIG. 6. For example, the first and second capacitor arrangements 68, 70 may shift the resonant frequency band of the combination from the second operational frequency band (described above with reference to FIG. 6) to a third operational frequency band.

Figure 10:
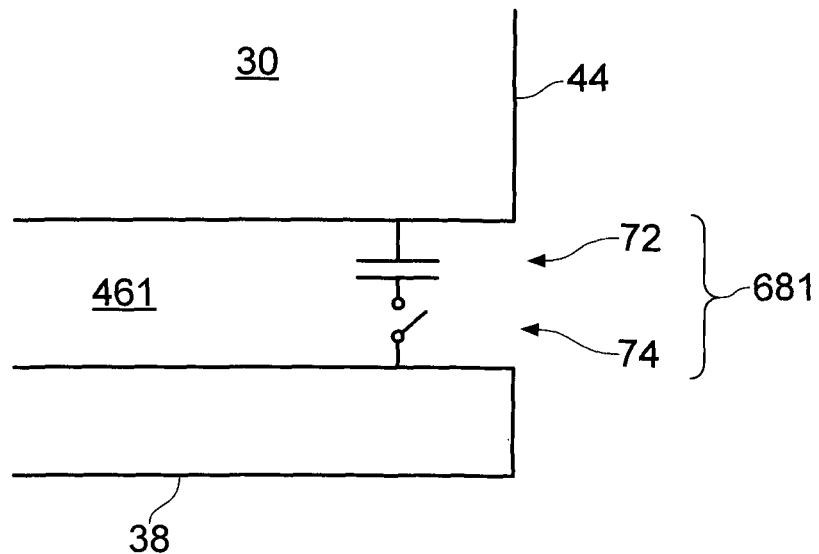
FIG. 10 illustrates a capacitor arrangement for the apparatus illustrated in FIG. 9 according to an example.

FIG. 10 illustrates a capacitor arrangement 681 for the apparatus 181 according to an example. The capacitor arrangement 681 includes a capacitor 72 connected to the first conductive layer 30, and a switch 74 connected between the capacitor 72 and the first edge 38 of the first conductive layer 30.

The capacitor arrangement 681 is switchable between a first electrical configuration in which the capacitor 72 is electrically connected to the first conductive layer 30 (where the switch 74 is closed), and a second electrical configuration in which the capacitor 72 is electrically disconnected from the first conductive layer 30 (where the switch 74 is open as illustrated in FIG. 10). When the capacitor arrangement 681 is in the first electrical configuration, the apparatus 181 is operable in the third operational frequency band, and when the capacitor arrangement 681 is in the second electrical configuration the apparatus 181 is operable in the second operational frequency band.

Figure 11:
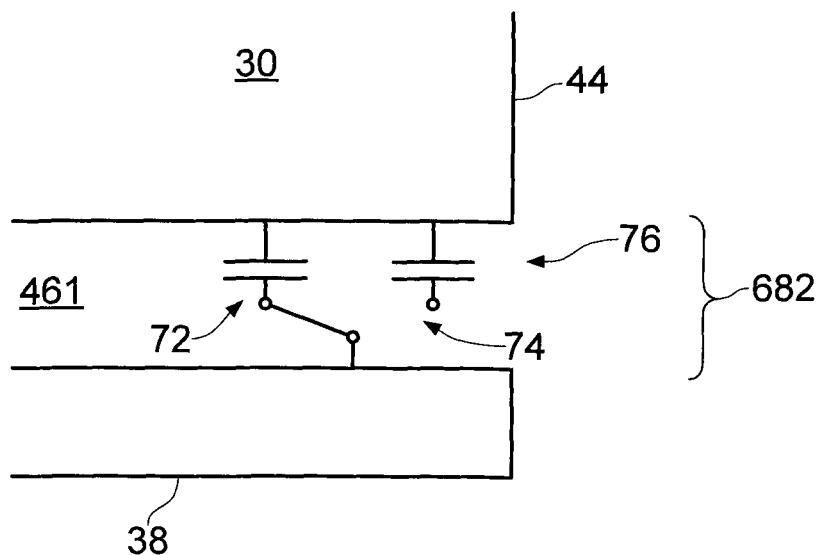
FIG. 11 illustrates a capacitor arrangement for the apparatus illustrated in FIG. 9 according to another example.

FIG. 11 illustrates a capacitor arrangement 682 for the apparatus 181 according to another example. The capacitor arrangement 682 is similar to the capacitor arrangement 681 and where the features are similar, the same reference numerals are used. The capacitor arrangement 682 differs from the capacitor arrangement 681 in that the capacitor arrangement 682 includes a further capacitor 76.

When the capacitor arrangement 682 is in the second electrical configuration, the further capacitor 76 is electrically connected to the first conductive layer 30 and consequently, the further capacitor 76 forms part of the second electrical length and the apparatus 181 is operable to resonate in a fourth resonant operational frequency band. Therefore, the capacitor arrangement 682 is switchable between a first electrical configuration in which the apparatus 181 is operable to resonate in a third operational frequency band, and a second electrical configuration in which the apparatus 181 is operable to resonate in a fourth operational frequency band.

Figure 12:
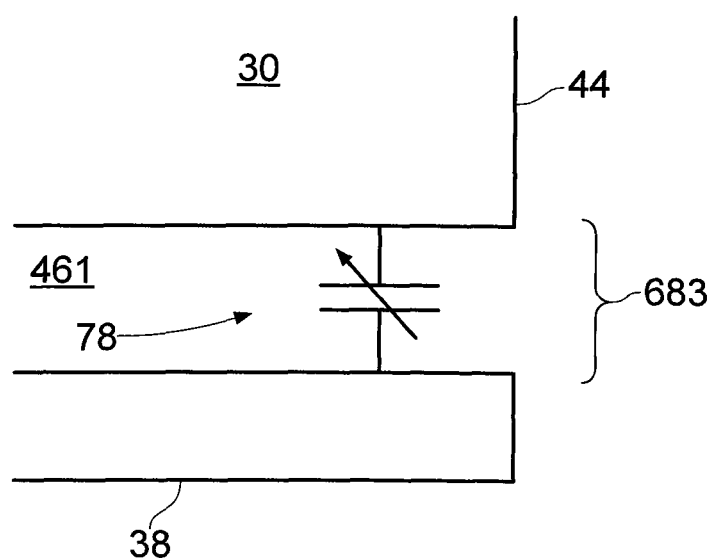
FIG. 12 illustrates a capacitor arrangement for the apparatus illustrated in FIG. 9 according to a further example.

FIG. 12 illustrates a capacitor arrangement 683 for the apparatus 181 according to a further example. The capacitor arrangement 683 includes a varactor 78 electrically connected to the first conductive layer 30.

The varactor 78 has a plurality of different electrical configurations that have different capacitance values. As described in the preceding paragraphs for FIGS. 10 and 11, the plurality of different electrical configurations enable the apparatus 181 to operate in a plurality of different operational frequency bands.

The controller 12 is configured to control the operation of the capacitor arrangements 681, 682, 683. For example, the controller 12 may determine that the apparatus 181 has been detuned (for example, due to a user handling the apparatus 181) by measuring reflected power at the radio frequency circuitry 16 and control the switch 74 or the varactor 78 to change configuration to tune the apparatus 181 to the desired operational frequency band. By way of another example, the controller 12 may determine that operation in the third operational frequency band is desired and control the switch 74 or the varactor 78 to provide operation in the third operational frequency band.

It should be appreciated that the second capacitor arrangement 70 may have any of the structures illustrated in FIGS. 10, 11 and 12. Additionally, it should be appreciated that the capacitive member 31 illustrated in FIG. 2 may include any of the capacitor arrangements illustrated in FIGS. 10, 11 and 12.

Figure 13:
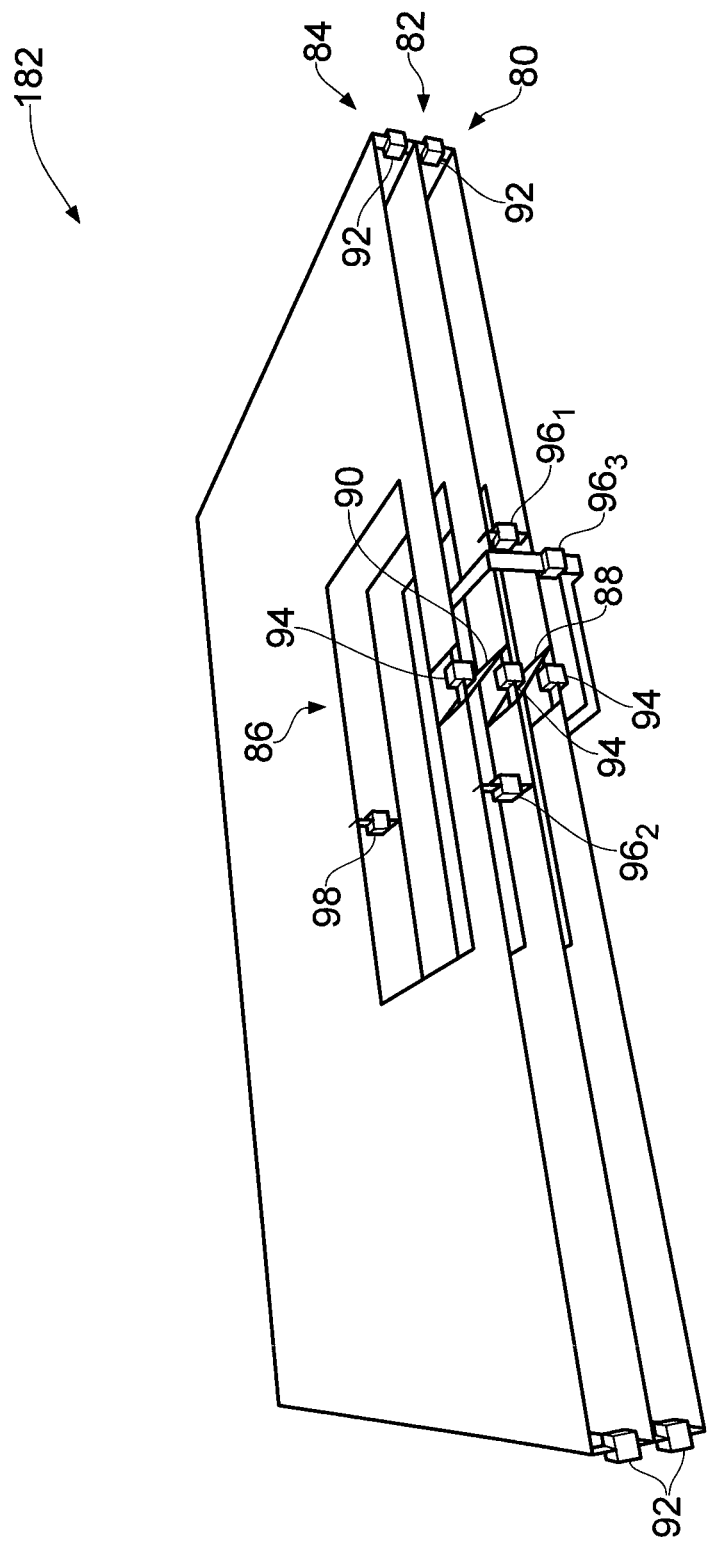
FIG. 13 illustrates a perspective view of a further apparatus according to an example.

FIG. 13 illustrates a perspective view of another apparatus 182 according to an example. The apparatus 182 includes a first conductive layer 80, a second conductive layer 82 and a third conductive layer 84 that have a similar structure to the conductive layer 30 illustrated in FIG. 2. In particular, the first, second and third conductive layers 80, 82, 84 define a slot 86 for receiving an inductive coupler (not illustrated in FIG. 13 to maintain the clarity of the figure).

The first conductive layer 80 is electrically coupled to the second conductive layer 82 via a first conductive portion 88 that extends from the opening of the slot 86 of the first conductive layer 80 to the opposing side of the opening of the slot 86 of the second conductive layer 82. The second conductive layer 82 is electrically coupled to the third conductive layer 84 via a second conductive portion 90 that extends from the opening of the slot 86 of the second conductive layer 82 to the opposing side of the opening of the slot 86 of the third conductive layer 84.

The apparatus 182 includes a plurality of capacitor arrangements and these are described in the following paragraphs. It should be appreciated that in various examples, the apparatus 182 may include a single capacitor arrangement of the plurality of capacitor arrangements, or any combination of the capacitor arrangements. Furthermore, it should be appreciated that the capacitors may have arrangements similar to those illustrated in FIGS. 10, 11 and 12. It should be appreciated that the capacitors may be provided in one or more of the conductive layers (as part of a printed wiring board) and a conductive trace or "via" extending between the layers makes the electrical connection between two of the layers.

The apparatus 182 includes capacitors 92 that are positioned between and couple the first and second conductive layers 80, 82 and between and couple the second and third conductive layers 82, 84. The capacitors 92 are located at the corners of the first, second and third conductive layers 80, 82, 84.

Additionally, the apparatus 182 includes capacitors 94 that are positioned at, and couple, the openings of the slots 86 of the first, second and third conductive layers 80, 82 and 84.

Furthermore, the apparatus 182 includes capacitors 96 that couple the first, second and third conductive layers 80, 82, 84 together at the openings of the slots 86. In particular, a first capacitor $96_1$ couples the first and second conductive layers 80, 82 at the opening of slots 86, a second capacitor $96_2$ couples the second and third conductive layers 82, 84 at the openings of the slots 86, and a third capacitor $96_3$ couples the first and third conductive layers 80, 84 at the openings of the slots 86.

Additionally, the apparatus 182 includes a capacitor 98 that couples the second and third conductive layers 82, 84 and is positioned at the closed ends of the slots 86 of the second and third conductive layers 82, 84. The apparatus 182 may also include a capacitor (not illustrated in the figure) that couples the first and second conductive layers 80, 82 and is positioned at the closed ends of the slots 86 of the first and second conductive layers 80, 82.

Figure 14:
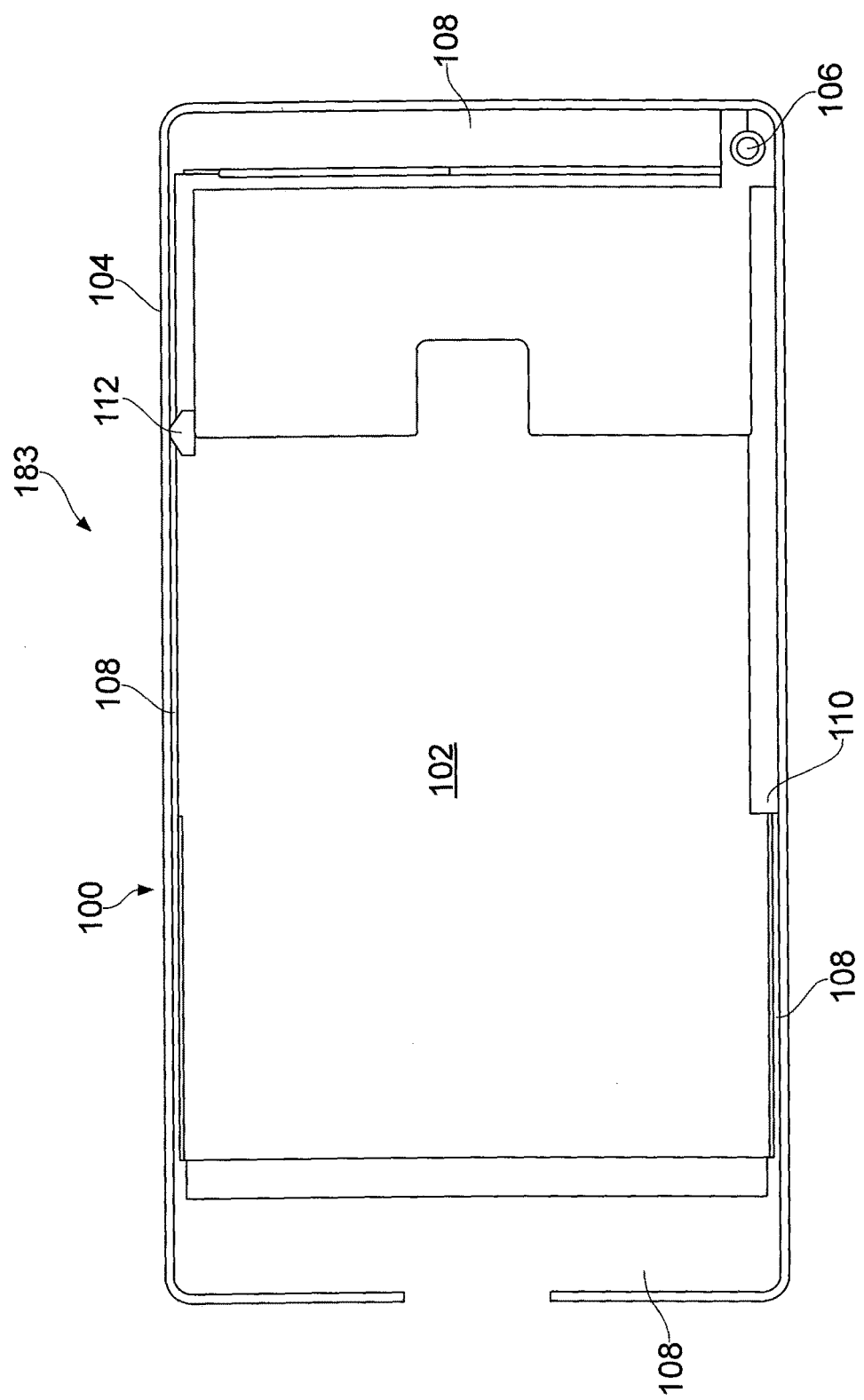
FIG. 14 illustrates a plan view of another apparatus according to an example.

FIG. 14 illustrates a plan view of another apparatus 183 according to an example. The apparatus 183 includes a conductive layer 100 that comprises a printed wiring board 102 and a conductive cover 104 that extends around the edges of the printed wiring board 102.

The printing wiring board 102 defines a slot 106 for receiving an inductive coupler therein. The slot 106 extends to a slot 108 defined between the printed wiring board 102 and the conductive cover 104. The slot 108 extends around the printed wiring board 102 and ends where the printed wiring board 102 is electrically coupled to the conductive cover 104 at position 110.

The apparatus 183 includes a capacitor arrangement 112 that is positioned in the slot 108 and is coupled to the printed wiring board 102 and to the conductive cover 104. The capacitor arrangement 112 is configured to tune the conductive layer 100 to resonate in an operational frequency band. The capacitor arrangement 112 may be any one of, or combination of, the capacitor arrangements illustrated in FIGS. 10, 11 and 12.

Figure 15:
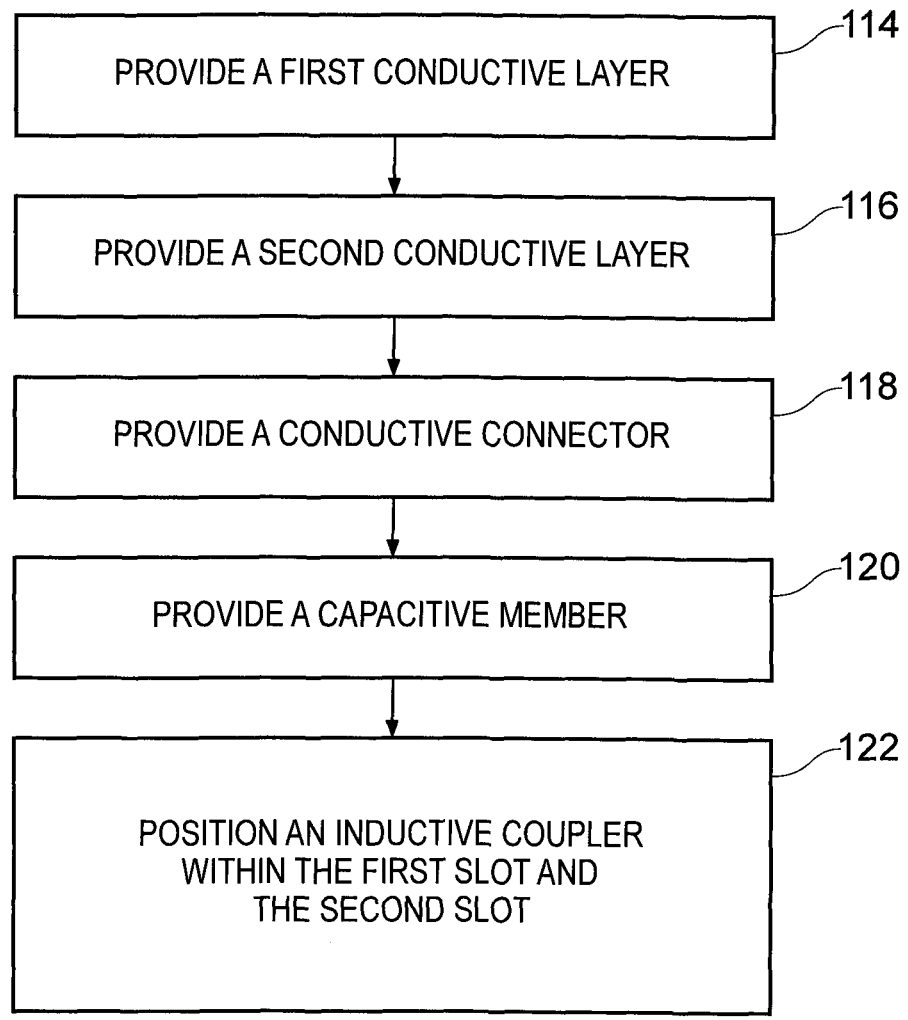
FIG. 15 illustrates a flow diagram of a method of manufacturing an apparatus according to an example.

FIG. 15 illustrates a flow diagram of a method of manufacturing an apparatus 18, 180, 181, 182, 183 according to an example.

At block 114, the method includes providing the first conductive layer. At block 116, the method may include providing the second conductive layer and any further layers. At block 118, the method may include providing a conductive connector and coupling the conductive layers together using the conductive connector. At block 120, the method includes providing a capacitive member. At block 122, the method includes positioning the inductive coupler within the slot of the conductive layer and (optionally) within the slots of any further conductive layers.

The blocks illustrated in FIG. 15 may represent steps in a method and/or sections of code in a computer program. For example, a controller may read the computer program and control machinery to execute the blocks illustrated in FIG. 15. The illustration of a particular order to the blocks does not necessarily imply that there is a required or preferred order for the blocks and the order and arrangement of the block may be varied. Furthermore, it may be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

For example, the first and second conductive layers 30, 48 may have any shape and may not be planar in some examples. Additionally, the first and second conductive layers 30, 48 may only partially overlay one another (that is, the edges of the first and second conductive layers 30, 48 may not overlay each other).

The slots 46, 58 may have any number of parts (including only one part that extends in a single direction) and may be oriented in any suitable directions relative to one another.

The conductive connector 60 may electrically couple any suitable portions of the first and second conductive layers 30, 48 together.

The inductive coupler 64 may have a different structure to the structure illustrated in FIG. 6. For example, the turns of the inductive structure may be circular instead of rectangular. Furthermore, the length of the inductive coupler 64 (in the Z axis 62) may be greater than or less than d1 (that is, the length of the inductive coupler 64 may be greater than or less than the spacing between the first and second conductive layers 30, 48).

The apparatus 181 may only include one of the first capacitor arrangement 68 and the second capacitor arrangement 70. Additionally, the first and second capacitor arrangements 68, 70 may positioned at any suitable locations within the slots 46, 58. Furthermore, it should be appreciated that while the first and second capacitor arrangements 68, 70 may be positioned within the slots 46, 58, this does not require them to be positioned in the same X-Y plane as the first and second conductive layers 30, 48 respectively.

In some examples, the antenna structure may be shielded from the device body using magnetic conductive sheet material, such as ferrite.

In examples where the apparatus includes a plurality of conductive layers, the conductive layers may have different shapes and/or dimensions. For example, one conductive layer may include the device body (grounding), and the other layers are smaller than the device body.

Where an apparatus does not include a capacitor arrangement and the capacitive member is provided by a conductive layer, the conductive layers may be relatively closely spaced in order to achieve a desired capacitance (for example, approximately 1 nH at 13 MHz).

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   a first conductive layer defining a first slot having an open end and a closed end, the first slot being configured to receive an inductive coupler therein;
   a capacitive member positioned at the first slot and configured to tune the first conductive layer to resonate in an operational frequency band; and
   a second conductive layer defining a second slot having an open end and a closed end, the second slot configured to receive the inductive coupler therein, the second conductive layer being electrically coupled to the first conductive layer,
   wherein the first conductive layer and the second conductive layer are electrically coupled via a conductive connector and the second conductive layer at least partially overlays the first conductive layer,
   wherein the first slot and the second slot extend in different and opposite directions for at least part of their lengths, and
   wherein the first conductive layer, the second conductive layer and the conductive connector collectively form a coil shape.

2. An apparatus as claimed in claim 1, wherein the capacitive member includes a capacitor arrangement, in an electrical configuration, comprises at least one capacitor, the capacitor being connected to the first conductive layer and positioned at the first slot.

3. An apparatus as claimed in claim 2, wherein the capacitor arrangement further comprises a switch configured to switch between the electrical configuration and another electrical configuration in which the capacitor is electrically disconnected from the first conductive layer.

4. An apparatus as claimed in claim 3, wherein the capacitor arrangement comprises a further capacitor, wherein when the capacitor arrangement is in the another electrical configuration, the further capacitor is electrically connected to the first conductive layer.

5. An apparatus as claimed in claim 2, wherein the capacitor is a varactor.

6. An apparatus as claimed in claim 1, further comprising an inductive coupler positioned within the first slot.

7. An apparatus as claimed in claim 6, wherein the inductive coupler is configured to resonate in a first operational frequency band different to the operational frequency band of the first conductive layer.

8. An apparatus as claimed in claim 1, wherein the conductive connector couples an edge portion of the first conductive layer with an edge portion of the second conductive layer.

9. An apparatus as claimed in claim 1, wherein at least one of the first and second conductive layers is a layer of a printed wiring board .

10. An apparatus as claimed in claim 1, wherein the first conductive layer and/or the second conductive layer form at least part of a cover of a portable electronic device.

11. A portable electronic device comprising an apparatus as claimed in claim 1.

12. A method comprising:
providing a first conductive layer defining a first slot having an open end and a closed end, the first slot being configured to receive an inductive coupler therein;
providing a capacitive member positioned at the first slot and configured to tune the first conductive layer to resonate in an operational frequency band; and
providing a second conductive layer defining a second slot having an open end and a closed end and configured to receive the inductive coupler therein, the second conductive layer being electrically coupled to the first conductive layer,
wherein the first conductive layer and the second conductive layer are electrically coupled via a conductive connector and the second conductive layer at least partially overlays the first conductive layer,
and wherein the first slot and the second slot extend in different and opposite directions for at least part of their lengths, and
wherein the first conductive layer, the second conductive layer and the conductive connector collectively form a coil shape.

13. A method as claimed in claim 12, wherein the capacitive member includes a capacitor arrangement, in an electrical configuration, comprises at least one capacitor, the capacitor being connected to the first conductive layer and positioned at the first slot.

14. A method as claimed in claim 13, wherein the capacitor arrangement further comprises a switch configured to switch between the electrical configuration and another electrical configuration in which the capacitor is electrically disconnected from the first conductive layer.

15. A method as claimed in claim 14, wherein the capacitor arrangement comprises a further capacitor, wherein when the capacitor arrangement is in the another electrical configuration, the further capacitor is electrically connected to the first conductive layer.

16. A method as claimed in claim 12, further comprising positioning an inductive coupler within the first slot, the inductive coupler being electrically isolated from the first conductive layer.

* * * * *